Dec. 7, 1937.  P. WARNICK ET AL  2,101,116
ELECTRIC MOTOR
Filed June 24, 1935
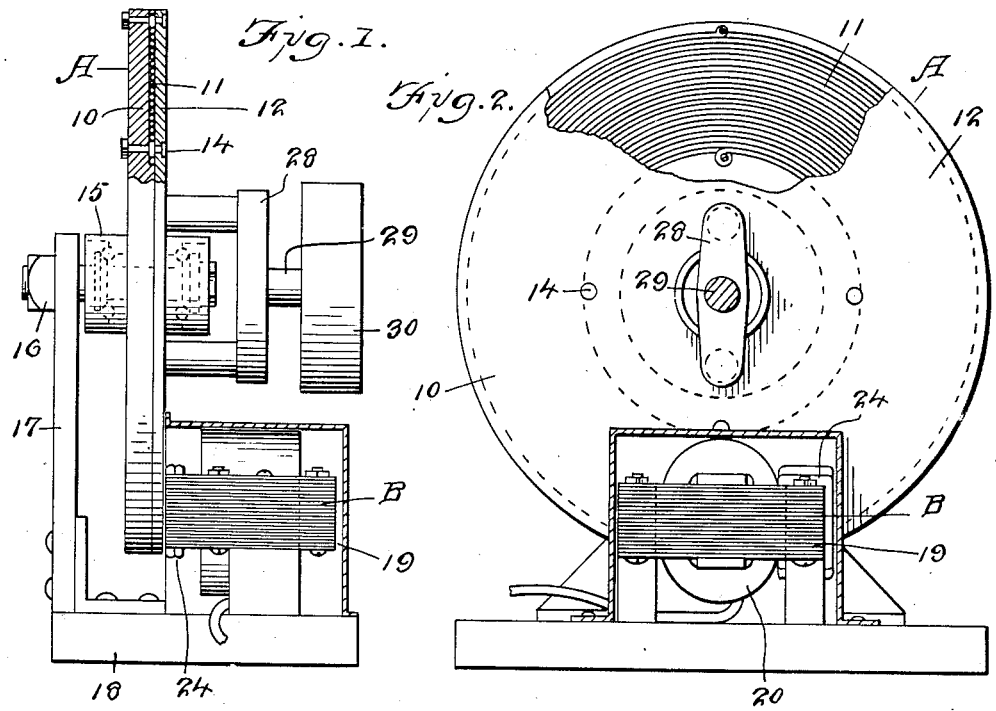
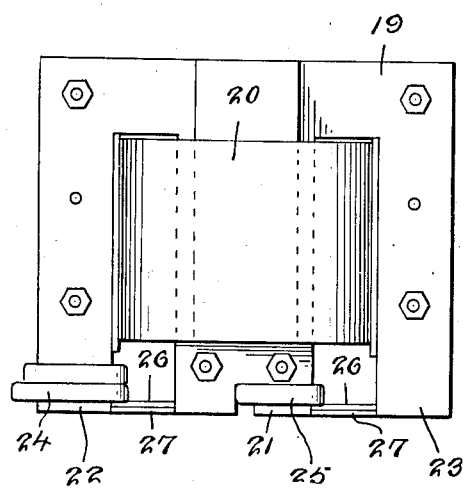
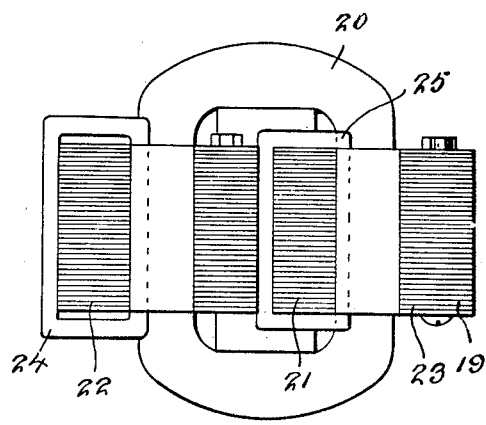
Paul Warnick
Walter H. Scott
INVENTOR
BY Victor J. Evans & Co.
ATTORNEY Patented Dec. 7, 1937

2,101,116

UNITED STATES PATENT OFFICE 2,101,116

ELECTRIC MOTOR

Paul Warnick and Walter H. Scott, Chicago, Ill., assignors to John L. Berggren, Chicago, Ill.

Application June 24, 1935, Serial No. 28,192

6 Claims. (Cl. 172—278)

The object of the invention is to provide an electric motor which will be free from sliding contacts, so that no fire hazard will be present in its use when unattended; to provide a motor of the small unit form, of which the efficiency will approximate unity; to provide a slow speed small unit motor having a high starting torque and a comparatively constant speed under all variations of load within its capacity; and to provide a motor which is of simple form and susceptible of cheap manufacture.

With this object in view, the invention consists in a construction and combination of parts, of which a preferred embodiment is illustrated in the accompanying drawing, wherein:

Figure 1 is a view partly in section and partly in elevation showing a motor constructed in accordance with the invention.

Figure 2 is a view similar to Figure 1 but looking in a direction at right angles to that in which Figure 1 is viewed.

Figure 3 is a top plan view of the stator unit.

Figure 4 is an elevational view of the stator unit looking at the pole faces.

Both the rotor A and stator B are modified over the usual construction of electric motors, both having refinements of design which produce most beneficial results.

The rotor A, which, in the illustrated embodiment, is of disk form, comprises a carrier 10 of insulating material, which may be wood or any other acceptable material, and a pair of metal elements 11 and 12, of which the former is preferably of steel, of a high degree of magnetic retentivity, and the latter preferably of copper superimposed on the steel but arranged to stand between it and the pole pieces of the stator B. Either a disk of steel may be employed for the magnetic element or it may be hard steel wire wound with the successive convolutions in lateral contact, so that it becomes in effect a disk if disposed on a disk form of carrier, or a band if disposed on the periphery of a ring form of carrier.

Fasteners 14, which may be rivets or bolts, secure the carrier 10 and elements 11 and 12 together. The carrier is mounted on the rotary element of a ball bearing 15, which is in turn secured by a bolt 16 to a standard 17, the latter upstanding from a base 18, on which the stator B is appropriately supported.

The stator B comprises a core 19 which is preferably triple legged with the winding 20 wound on the center leg. The free ends of the several legs constitute pole pieces, of which the center pole 21 and end pole 22 are shaded but the end pole 23 is unshaded. The shading coils 24 on the pole 22 are preferably two in number, while the shading of the center pole 21 is accomplished by a single coil 25. This arrangement provides a progressive degree of shading on the several poles and in that way produces a continuous torque on the rotor, the pull being represented by a comparatively great twisting or turning effort at the axis of the rotor in view of the fact that the pull is applied to the rotor at or adjacent its periphery. The pull applied to the rotor is intensified by the application of bridges between adjacent poles, each bridge consisting of dual sheets of magnetic and non-magnetic material, the sheets or strips 26 being preferably of iron or steel and the sheets 27 of copper. This arrangement results in a much greater torque than is the case without them, and it is presumed that they serve to isolate the flux of one pole from the flux of an adjacent pole in the inductive effect of the latter on the rotor.

High torque produced in the rotor is presumed to result in the generation of currents in the disk element 12, and these currents act to establish poles in the element 11 which are not quickly dissipated by reason of the high magnetic retentivity of the element 11. In order that the stator may be adapted to drive any desired load, it is provided with a yoke member 28, from which projects a shaft 29 on which the drive pulley 30 is carried. If directly connected to the load, the direct connection is made through the shaft 29 after the pulley 30 is removed.

The invention having been described, what is claimed as new and useful is:

1. An electric motor comprising a stator having successive poles increasingly lagged, and a rotor having a part of its area continuously exposed to the inductive action of the stator poles, the rotor comprising a duality of flat metal elements of which one is magnetic and the other non-magnetic, the magnetic element being of a high degree of magnetic retentivity.

2. An electric motor comprising a stator having successive poles increasingly lagged, and a rotor having a part of its area continuously exposed to the inductive action of the stator poles, the rotor comprising a duality of flat metal elements of which one is of high magnetic retentivity and the other non-magnetic, the magnetic element being of sheet form disposed adjacent one face of the stator and the non-magnetic element being in the form of a sheet laid on the magnetic element.

3. An electric motor comprising a stator having successive poles increasingly lagged, and a rotor having a part of its area continuously exposed to the inductive action of the stator poles, the rotor comprising a duality of flat metal elements of which one is of high magnetic retentivity and the other non-magnetic, the magnetic element being of sheet form disposed adjacent one face of the stator and the non-magnetic element being in the form of a sheet laid on the magnetic element but intervening between it and the stator poles.

4. An electric motor comprising a stator having successive poles increasingly lagged, and a rotor having a part of its area continuously exposed to the inductive action of the stator poles, the rotor comprising a duality of flat metal elements of which one is of high magnetic retentivity and the other non-magnetic, the magnetic element being of sheet form disposed adjacent one face of the stator and the non-magnetic element being in the form of a sheet laid on the magnetic element but intervening between it and the stator poles, the magnetic element being of stranded form and wound into a coil whose convolutions are in lateral contact.

5. An electric motor comprising a rotor having a magnetic element of a high degree of hardness disposed superficially upon it in sheet form and a non-magnetic element of sheet form superimposed upon the magnetic element and a plural pole stator comprising an exciting winding, and means to produce a magnetic lag in the same so that the degree of lag in each pole is greater than in the next preceding.

6. An electric motor comprising a stator having successive poles increasingly lagged, and a rotor having a part of its area continuously exposed to the inductive action of the stator poles, the rotor comprising a duality of metal elements of which one is high in magnetic retentivity and the other of high electrical conductivity disposed in shielding relation to the first.

PAUL WARNICK.
WALTER H. SCOTT.